United States Patent
Huang

(10) Patent No.: US 8,241,417 B2
(45) Date of Patent: Aug. 14, 2012

(54) NANOCOMPOSITE COATING AND THE METHOD OF COATING THEREOF

(75) Inventor: Chih-Hao Huang, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 861 days.

(21) Appl. No.: 12/276,117

(22) Filed: Nov. 21, 2008

(65) Prior Publication Data

US 2010/0129555 A1    May 27, 2010

(51) Int. Cl.
*C09D 7/12*    (2006.01)

(52) U.S. Cl. ......... 106/287.35; 106/287.18; 106/287.19; 106/287.26; 106/287.34

(58) Field of Classification Search ............ 106/287.34, 106/287.18, 287.19, 287.26, 287.35; 501/12
See application file for complete search history.

(56) References Cited

U.S. PATENT DOCUMENTS

| | | | | |
|---|---|---|---|---|
| 5,731,091 | A * | 3/1998 | Schmidt et al. | 428/428 |
| 6,001,164 | A * | 12/1999 | Watanabe et al. | 106/287.13 |
| 6,921,578 | B2 * | 7/2005 | Tsujino et al. | 428/428 |
| 2006/0204655 | A1 * | 9/2006 | Takahashi | 427/180 |
| 2007/0000407 | A1 * | 1/2007 | Leong | 106/15.05 |
| 2007/0119344 | A1 * | 5/2007 | Yeung et al. | 106/287.34 |
| 2007/0196567 | A1 * | 8/2007 | Kojima et al. | 427/162 |
| 2008/0090006 | A1 * | 4/2008 | Yoshinaka et al. | 427/212 |
| 2009/0223412 | A1 * | 9/2009 | Bockmeyer et al. | 106/287.19 |
| 2010/0016502 | A1 * | 1/2010 | Rentrop et al. | 524/588 |

* cited by examiner

*Primary Examiner* — David M Brunsman
(74) *Attorney, Agent, or Firm* — WPAT, P.C.; Anthony King

(57) ABSTRACT

A nanocomposite coating and a method of coating for protecting a product with the nanocomposite coating are presented. Firstly, the nanocomposite coating is prepared, wherein the nanocomposite coating is formed by mixing 22.5~49.5% nanometer inorganic oxide gel made by a sol-gel method, 45~74.25% organic solvent and 1~10% nanometer powder together. Next, the nanocomposite coating is coated onto surfaces of the product evenly by way of spraying, dipping or roll-to-rolling. Lastly, the product coated with the nanocomposite coating is subjected to a room temperature or a heating environment lower than 170 degrees centigrade to make the nanocomposite coating dry for forming nanometer protective films on the surfaces of the product.

7 Claims, No Drawings

NANOCOMPOSITE COATING AND THE METHOD OF COATING THEREOF

BACKGROUND OF THE INVENTION

1. Field of the Invention

The present invention generally relates to a coating and uses thereof, and more particularly to a nanocomposite coating and a method of coating for protecting a product with the nanocomposite coating.

2. The Related Art

At present, lots of products are made of engineering plastic materials. However, some engineering plastic materials, such as polycarbonate and modified polyphenylene oxide, are easily corroded and damaged by some exterior chemicals, such as organic alcohol, organic ketone, acid, alkali and oil etc. In order to protect the products made of the foregoing engineering plastic materials from being corroded and damaged, a nanocomposite coating and a method of coating for protecting the products with the nanocomposite coating are required.

SUMMARY OF THE INVENTION

An object of the present invention is to provide a nanocomposite coating and a method of coating for protecting a product with the nanocomposite coating. The nanocomposite coating is formed by mixing a nanometer inorganic oxide gel, an organic solvent and a nanometer powder together. The nanometer inorganic oxide gel is made by a sol-gel method and has 22.5~49.5% weight in the nanocomposite coating. The organic solvent has 45~74.25% weight in the nanocomposite coating. The nanometer powder has 1~10% weight in the nanocomposite coating. The method is adapted to protect the product from being corroded and damaged by some exterior chemicals and is described hereinafter. Firstly, prepare the foregoing nanocomposite coating. Next, coat the nanocomposite coating onto surfaces of the product evenly by way of spraying, dipping or roll-to-rolling. Lastly, subject the product coated with the nanocomposite coating to a room temperature or a heating environment lower than 170 degrees centigrade to make the nanocomposite coating dry for forming nanometer protective films on the surfaces of the product so as to protect the product from being corroded and damaged by the exterior chemicals.

As described above, the nanocomposite coating of the present invention can protect the product from being corroded and damaged by the exterior chemicals by way of forming the nanometer protective films on the surfaces of the product.

DETAILED DESCRIPTION OF THE PREFERRED EMBODIMENT

A nanocomposite coating according to the present invention is a mixture of a nanometer inorganic oxide gel, an organic solvent and a nanometer powder, wherein the weight percentage of the nanometer inorganic oxide gel, the organic solvent and the nanometer powder in the nanocomposite coating is respectively 22.5~49.5%, 45~74.25% and 1~10%. The nanometer inorganic oxide gel is made by a sol-gel method and can be any one of or a mixture of at least two selected from a nanometer silicon dioxide gel, a nanometer titanium dioxide gel and a nanometer zirconium dioxide gel. The organic solvent can be any one of or a mixture of an ethanol solvent and an isopropanol solvent. The nanometer powder has a 5~100 nm diameter and can be any one of or a mixture of a nanometer metal powder and a nanometer metal-oxide powder, wherein the nanometer metal powder can be any one of or a mixture of at least two selected from a nanometer platinum powder, a nanometer copper powder and a nanometer nickel powder and so on, the nanometer metal-oxide powder can be any one of or a mixture of at least two selected from a nanometer silicon dioxide powder, a nanometer titanium dioxide powder and a nanometer zirconium dioxide powder and so on. Furthermore, the nanometer powder is processed by a surfactant before being mixed with the nanometer inorganic oxide gel and the organic solvent for improving a corrosion resistance thereof and further improving a corrosion resistance of the nanocomposite coating, wherein the surfactant can be any one of or a mixture of a sodium dodecylsulphonate and a polyvinyl pyrrolidone.

A method of coating for protecting a product with the foregoing nanocomposite coating is mainly adapted to protect the product from being corroded and damaged by some exterior chemicals, such as organic alcohol, organic ketone, acid, alkali and oil etc. The method is described hereinafter.

Firstly, the foregoing nanocomposite coating is prepared.

Next, the nanocomposite coating is coated onto surfaces of the product evenly by way of spraying, dipping or roll-to-rolling.

Lastly, the product coated with the nanocomposite coating is subjected to a room temperature or a heating environment lower than 170 degrees centigrade to make the nanocomposite coating dry (namely, evaporated to be a gas phase) for forming nanometer protective films on the surfaces of the product so as to protect the product from being corroded and damaged by the exterior chemicals.

An unlimited embodiment is described as following. In the unlimited embodiment, the product is made of polyurethane plastic and the nanometer powder processed by the surfactant is a nanometer silicon dioxide powder having 2% weight in the nanocomposite coating and a 20 nm diameter. The product is processed by the above-mentioned method for forming nanometer protective films of 50 microns thickness on the surfaces thereof. Next, do a corrosion-resisting test to the product with and without the nanometer protective films thereon respectively. Put the product with and without the nanometer protective films thereon respectively into 100% concentration of propyl alcohol solution, 95# leadless gasoline, engine oil and 6 mol/L of sodium hydroxide solution for being reacted about 12 hours. Experiment results show that, the product with the nanometer protective films thereon is scarcely corroded and damaged, while the product without the nanometer protective films thereon is seriously corroded and damaged in the propyl alcohol solution and is more or less corroded and damaged in another three solutions. Therefore, it is known from the unlimited embodiment that the nanometer protective films formed by the nanocomposite coating can really protect the product from being corroded and damaged by the exterior chemicals well.

As described above, the nanocomposite coating of the present invention can well protect the product from being corroded and damaged by the exterior chemicals by way of forming the nanometer protective films on the surfaces of the product. Furthermore, the nanometer powder processed by the surfactant can further improve the corrosion resistance of the nanometer protective films.

What is claimed is:

1. A nanocomposite coating, comprising:
    a nanometer inorganic oxide gel made by a sol-gel method and having 22.5~49.5% weight in the nanocomposite coating;
    an organic solvent having 45~74.25% weight in the nanocomposite coating; and a nanometer powder having 1~10% weight in the nanocomposite coating;

wherein the nanocomposite coating is formed by mixing the nanometer inorganic oxide gel, the organic solvent and the nanometer powder together;

wherein the nanometer powder is processed by a surfactant before being mixed with the nanometer inorganic oxide gel and the organic solvent to form the nanocomposite coating;

wherein the surfactant is any one of or a mixture of a sodium dodecylsulphonate and a polyvinyl pyrrolidone.

2. The nanocomposite coating as claimed in claim 1, wherein the nanometer powder is any one of or a mixture of a nanometer metal powder and a nanometer metal-oxide powder.

3. The nanocomposite coating as claimed in claim 2, wherein the nanometer metal powder is any one of or a mixture of at least two selected from a nanometer platinum powder, a nanometer copper powder and a nanometer nickel powder.

4. The nanocomposite coating as claimed in claim 2, wherein the nanometer metal-oxide powder is any one of or a mixture of at least two selected from a nanometer silicon dioxide powder, a nanometer titanium dioxide powder and a nanometer zirconium dioxide powder.

5. The nanocomposite coating as claimed in claim 1, wherein the diameter of the nanometer powder is 5~100 nm.

6. The nanocomposite coating as claimed in claim 1, wherein the nanometer inorganic oxide gel is any one of or a mixture of at least two selected from a nanometer silicon dioxide gel, a nanometer titanium dioxide gel and a nanometer zirconium dioxide gel.

7. The nanocomposite coating as claimed in claim 1, wherein the organic solvent is any one of or a mixture of an ethanol solvent and an isopropanol solvent.

* * * * *